(12) United States Patent
Subramanian et al.

(10) Patent No.: US 11,387,949 B2
(45) Date of Patent: Jul. 12, 2022

(54) TRANSMITTING ACKNOWLEDGMENT MESSAGES ON PREFERRED LINK IN 5G CARRIER AGGREGATION

(71) Applicant: Apple Inc., Cupertino, CA (US)

(72) Inventors: Sriram Subramanian, Santa Clara, CA (US); Tarakkumar G. Dhanani, San Jose, CA (US); Shiva Krishna Narra, San Jose, CA (US); Sharad Garg, Cupertino, CA (US); Vijay Gadde, San Jose, CA (US); Madhukar K. Shanbhag, Santa Clara, CA (US); Sandeep K. Sunkesala, San Jose, CA (US); Sree Ram Kodali, San Jose, CA (US); Haitong Sun, Irvine, CA (US); Sanjeevi Balasubramanian, San Jose, CA (US); Vishwanth Kamala Govindaraju, Mountain View, CA (US); Wei Zhang, Santa Clara, CA (US); Wei Zeng, San Diego, CA (US); Dawei Zhang, Saratoga, CA (US); Yuchul Kim, San Jose, CA (US); Hong He, Cupertino, CA (US); Alosious Pradeep Prabhakar, Singapore (SG)

(73) Assignee: Apple Inc., Cupertino, CA (US)

( * ) Notice: Subject to any disclaimer, the term of this patent is extended or adjusted under 35 U.S.C. 154(b) by 100 days.

(21) Appl. No.: 16/902,656

(22) Filed: Jun. 16, 2020

(65) Prior Publication Data
US 2021/0050946 A1 Feb. 18, 2021

Related U.S. Application Data

(60) Provisional application No. 62/887,826, filed on Aug. 16, 2019.

(51) Int. Cl.
*H04L 1/18* (2006.01)
*H04W 76/15* (2018.01)

(52) U.S. Cl.
CPC .......... *H04L 1/1812* (2013.01); *H04W 76/15* (2018.02)

(58) Field of Classification Search
CPC ..... H04W 80/04; H04W 88/06; H04W 88/08; H04W 84/18; H04L 29/06; H04L 1/1812
(Continued)

(56) References Cited

U.S. PATENT DOCUMENTS 9,148,262 B2 * 9/2015 Yang .................. H04L 1/1861
10,368,253 B2 7/2019 Lei et al.
(Continued)

FOREIGN PATENT DOCUMENTS

CA  WO 2014/021935 A1 * 2/2014 ............... H04L 1/16
WO  2014021935 A1   6/2014

*Primary Examiner* — Peter G Solinsky
*Assistant Examiner* — Sanjay K Dewan
(74) *Attorney, Agent, or Firm* — Kowert, Hood, Munyon, Rankin & Goetzel, P.C.

(57) ABSTRACT

This disclosure relates to methods and devices for transmitting acknowledgment messages on a preferred cell in a carrier aggregation scenario. A user equipment device (UE) establishes a connection with a primary cell and one or more secondary cells, and determines a preferred cell from among the primary cell and the one or more secondary cells based at least in part on one or more quality metrics. The UE may determine the preferred cell at least in part in response to determining that transmission power of the UE has been limited due to a specific absorption rate (SAR) backoff feature of the UE. The UE transmits a notification to a network indicating that the UE intends to transmit an acknowledgement message to the preferred cell, and transmits the acknowledgment message to the preferred cell.

20 Claims, 6 Drawing Sheets

(58) Field of Classification Search
USPC .......................................................... 370/328
See application file for complete search history.

(56) References Cited

U.S. PATENT DOCUMENTS

| | | | |
|---|---|---|---|
| 10,548,039 B2 | 1/2020 | Park et al. | |
| 2012/0147801 A1* | 6/2012 | Ho .................... | H04W 52/365 370/311 |
| 2012/0178494 A1* | 7/2012 | Haim ................. | H04W 52/365 455/522 |
| 2014/0092824 A1* | 4/2014 | He ..................... | H04L 5/14 370/329 |
| 2014/0328332 A1* | 11/2014 | Yang .................. | H04L 1/1812 370/336 |
| 2015/0012472 A1 | 1/2015 | Liang et al. | |
| 2015/0296486 A1* | 10/2015 | Park ................... | H04W 48/00 370/329 |
| 2016/0024933 A1 | 1/2016 | Hiernaux | |
| 2016/0100426 A1* | 4/2016 | Fang .................. | H04W 74/004 370/329 |
| 2017/0099621 A1* | 4/2017 | Michaelsen ....... | H04W 36/0033 |
| 2018/0007574 A1 | 1/2018 | Park et al. | |
| 2021/0051601 A1* | 2/2021 | Cha ................... | H04B 1/3838 |
| 2021/0067209 A1* | 3/2021 | Gopal ................ | H04B 7/0602 |
| 2021/0105820 A1* | 4/2021 | Kim ................... | H04W 74/0891 |

* cited by examiner

TRANSMITTING ACKNOWLEDGMENT MESSAGES ON PREFERRED LINK IN 5G CARRIER AGGREGATION

PRIORITY CLAIM

This application claims priority to U.S. Provisional Patent Application No. 62/887,826, titled "Transmitting Acknowledgment Messages on Preferred Link in 5G Carrier Aggregation" and filed on Aug. 16, 2019, which is hereby incorporated by reference in its entirety, as though fully and completely set forth herein.

TECHNICAL FIELD

The present application relates to wireless communication, including methods, systems, and apparatuses to transmit acknowledgment messages during a carrier aggregation scenario.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. For example, the design of wireless networks may increasingly include carrier aggregation (CA). During a CA communication session, a wireless device may be in communication with each of a primary cell (PCell) and one or more secondary cells (SCells). The introduction of multiple active cells may introduce complications for realizing effective communication. Therefore, improvements in the field are desired.

SUMMARY

Embodiments are presented herein of, inter alia, systems, apparatuses, and methods for transmitting acknowledgment messages on a preferred cell in a carrier aggregation (CA) scenario.

In some embodiments, a user equipment device (UE) establishes a connection with a primary cell and one or more secondary cells, and determines a preferred cell from among the primary cell and the one or more secondary cells based at least in part on one or more quality metrics. The UE may determine a preferred cell in response to detecting that a specific absorption rate (SAR) backoff procedure has been implemented by the device, whereby transmission power of the UE is throttled due to a grip state of the user, in some embodiments. The UE transmits a notification to a network indicating that the UE intends to transmit an acknowledgement message to the preferred cell, and transmits the acknowledgment message to the preferred cell.

In some embodiments, the UE may periodically monitor the one or more quality metrics to obtain one or more updated quality metrics. In these embodiments, the UE may dynamically redetermine the preferred cell from among the primary cell and the one or more secondary cells based at least in part on the one or more updated quality metrics.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
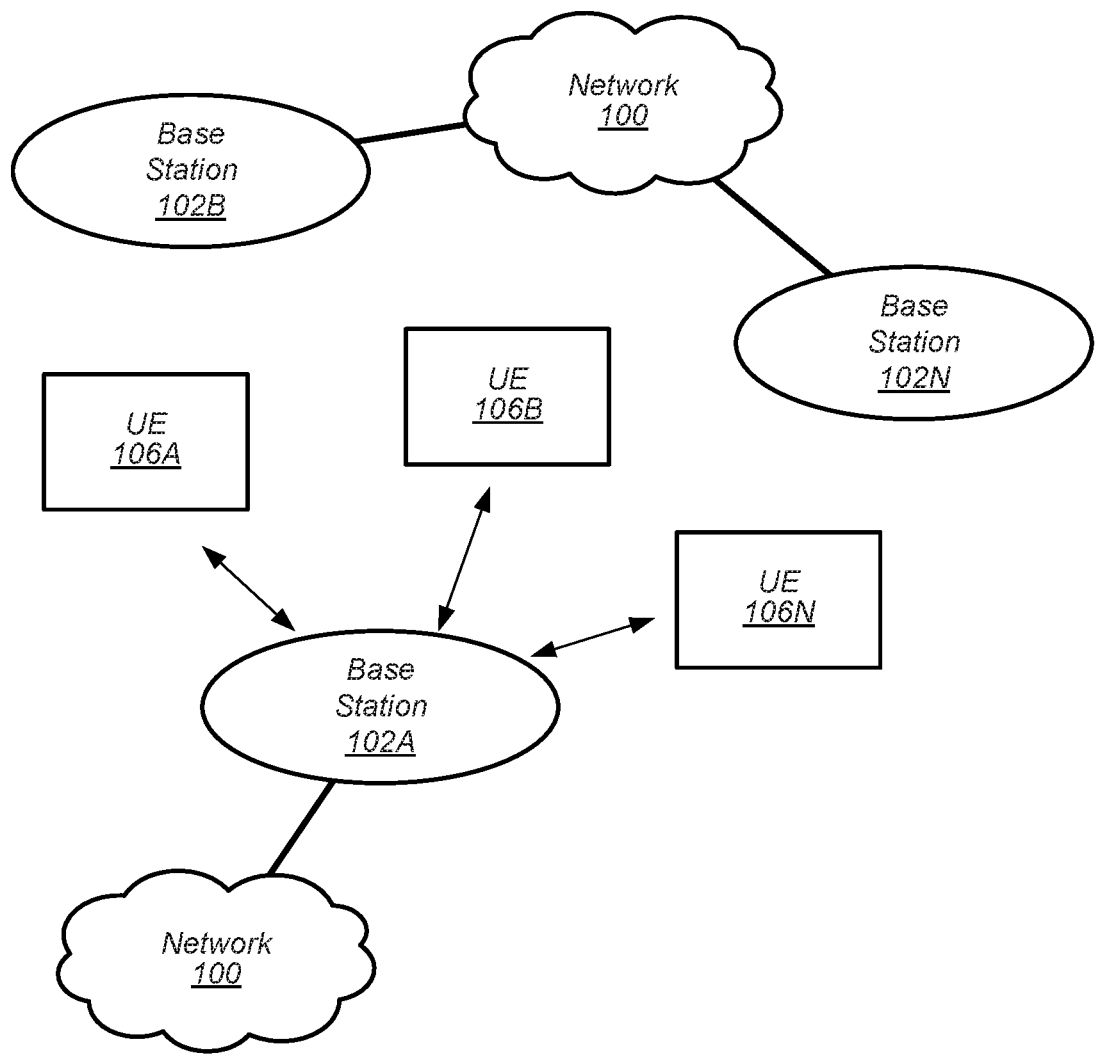
FIG. 1 illustrates an exemplary (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
RAN: Radio Access Network
GSM: Global System for Mobile Communications UMTS: Universal Mobile Telecommunications System
UTRAN: UMTS Terrestrial Radio Access Network or Universal Terrestrial Radio Access Network
UE: User Equipment
LTE: Long Term Evolution
NR: New Radio
E-UTRAN: Evolved UMTS Radio Access Network or Evolved Universal Radio Access Network
RRC: Radio Resource Control
RLC: Radio Link Control
MAC: Media Access Control
PDCP: Packet Data Convergence Protocol
RF: radio frequency
DL: downlink
UL: uplink
NW: Network
BS: base station
MME: Mobility Management Entity
AMF: Access Management Function
AS: access stratum
NAS: non-access stratum
RAT: radio access technology
PLMN: public land mobile network
LAA: licensed assisted access
CA: carrier aggregation
Rx: receiver
PDCCH: physical downlink control channel
PDSCH: physical downlink shared channel
PRB: physical resource block
DCI: downlink control information
SNR: signal-noise ratio
RSRP: reference signal received power
SF: subframe Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™ Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20

MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
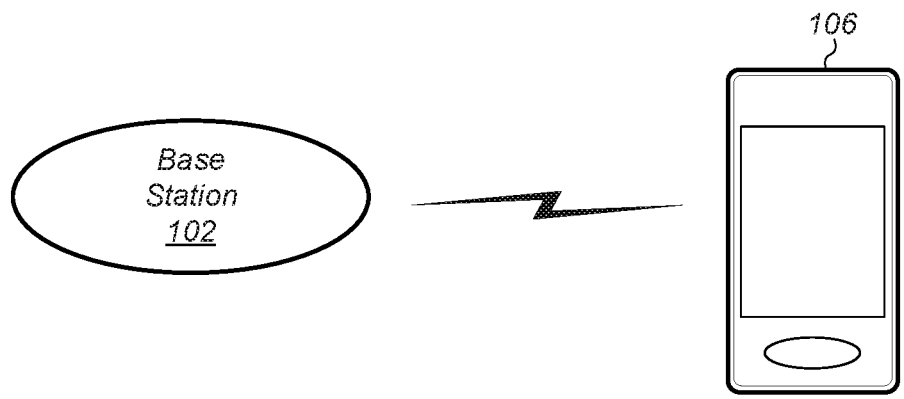
FIG. 2 illustrates a base station (BS) in communication with a user equipment (UE) device, according to some embodiments.

FIGS. 1-2—Communication System

FIG. 1 illustrates an exemplary (and simplified) wireless communication system in which aspects of this disclosure may be implemented, according to some embodiments. For example, any or all of the wireless devices illustrated in FIG. 1 may be configured for performing signal detection as described herein, e.g., according to one or more of the methods described herein. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware and/or software that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication among the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), NR, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, UMTS, LTE, LTE-A, NR, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple input multiple output (MIMO) communications) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

The UE 106 and/or BS 102 may be configured to perform carrier aggregation (CA). For example, the BS 102 may use carriers using any combination of RATs to communicate with UE 106. As one possibility, the UE 106 and BS 102 may employ licensed assisted access (LAA) techniques, and may thus aggregate licensed and unlicensed spectrum for communication. Carrier aggregation may employ a primary cell (PCell) and one or more secondary cells (SCells), which may be collocated within a single base station tower, or may be distributed over a first BS and one or more neighboring BSs, according to various embodiments.

Figure 3:
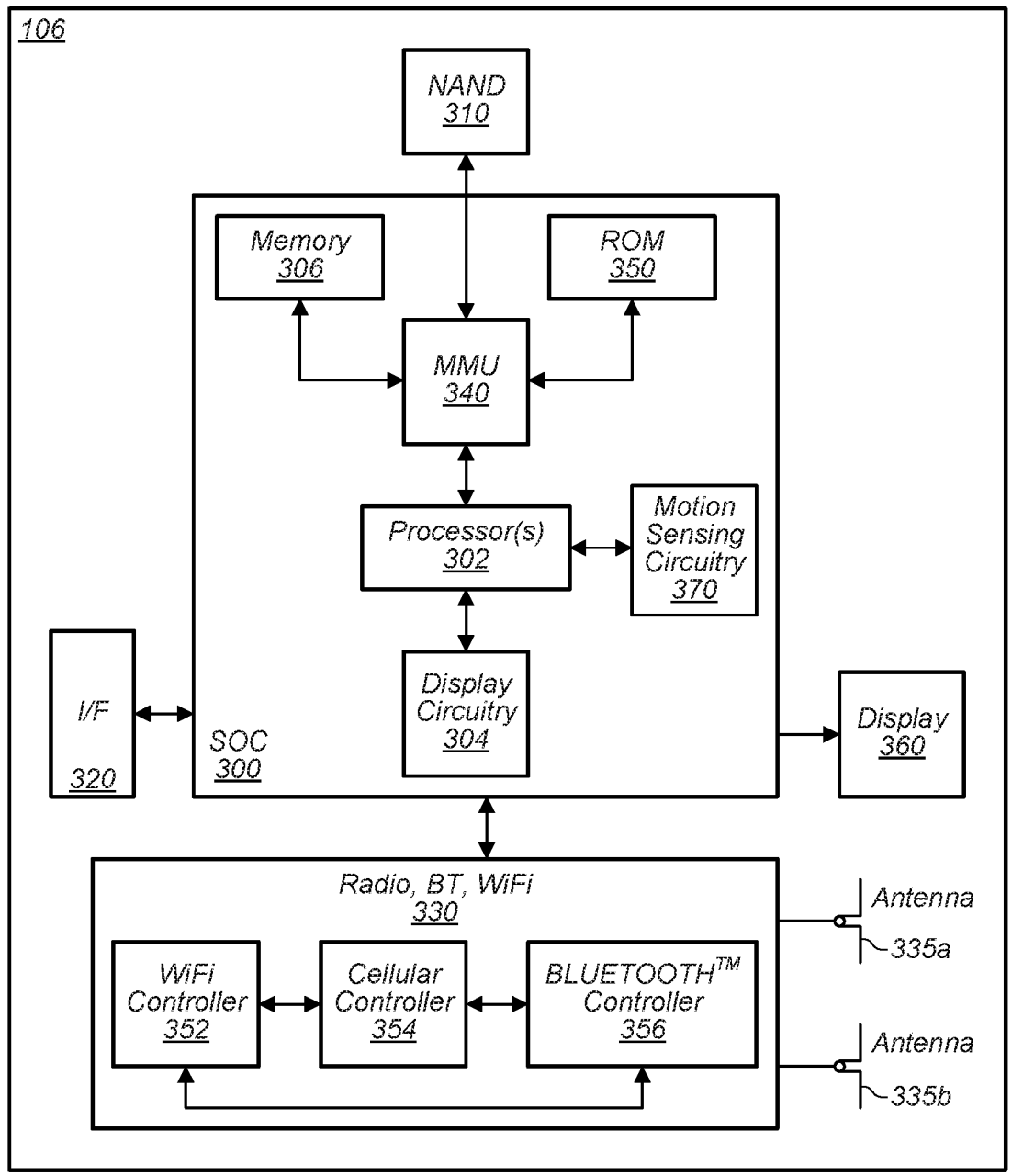
FIG. 3 illustrates an exemplary block diagram of a UE, according to some embodiments.

FIG. 3—Block Diagram of a UE Device

FIG. 3 illustrates one possible block diagram of a UE device 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106 may include at least one antenna, and in some embodiments multiple antennas 335a and 335b (and/or further additional antennas), for performing wireless communication with base stations and/or other devices. For example, the UE device 106 may use antennas 335a and 335b to perform the wireless communication. As noted above, the UE device 106 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106 to perform Wi-Fi communications on an 802.11 network. The Bluetooth Logic 336 is for enabling the UE device 106 to perform Bluetooth communications. The cellular modem 334 may be a lower power cellular modem capable of performing cellular communication according to one or more cellular communication technologies (e.g., LTE, 5G NR, GSM, etc.).

As described herein, UE 106 may include hardware and software components for implementing embodiments of this disclosure. For example, one or more components of the wireless communication circuitry 330 (e.g., cellular modem 334) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
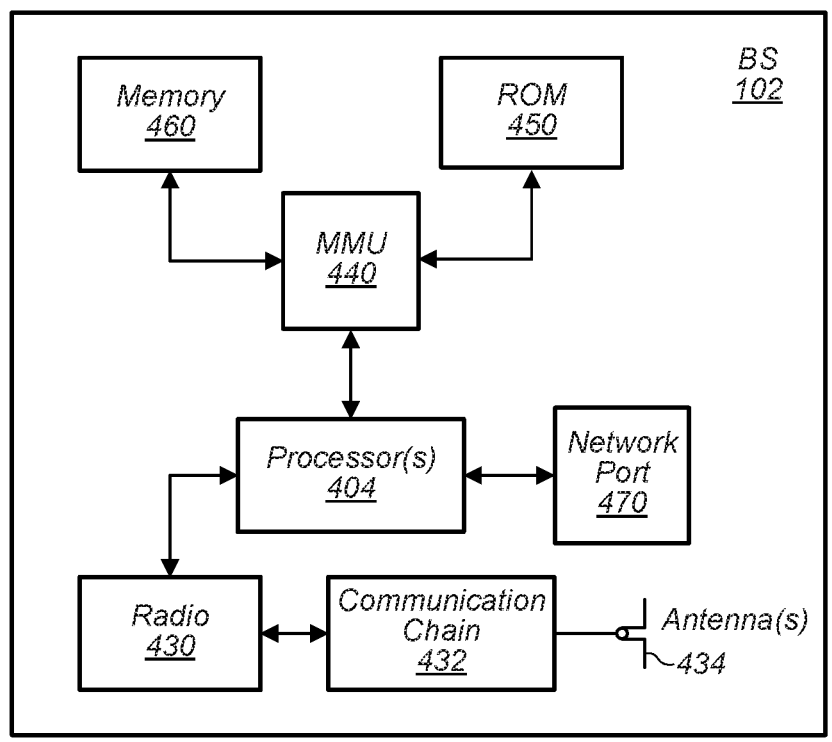
FIG. 4 illustrates an exemplary block diagram of a BS, according to some embodiments.

FIG. 4—Block Diagram of a Base Station (BS)

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430 (or multiple radios 430). The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, LTE and 5G NR, UMTS and GSM, etc.). The BS 102 may provide one or more cells of one or more communication technologies and/or one or more public land mobile networks (PLMNs). The BS 102 may provide multiple cells which may be organized, grouped, or configured as one or more cell sets, according to some embodiments. One or more cell sets that are provided by BS 102 may also include cells provided by one or more additional base stations, according to some embodiments.

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein. The BS 102 may be configured to perform carrier aggregation (CA).

The BS 102 may be an eNodeB (eNB) or gNodeB (gNB), according to various embodiments.

Carrier Aggregation

5G New Radio (NR) and LTE, as well as other wireless networks, may include carrier aggregation (CA), enabling a user equipment device (UE) such as the UE 106 to communicate with multiple cells on separate bandwidths to increase overall throughput. CA techniques may allow for increased throughput or performance by efficiently using the spectrum/frequency resources available to a network. CA techniques may be used entirely in licensed spectrum, entirely in unlicensed spectrum, or in a mixture of licensed and unlicensed spectrum. For example, licensed assisted access (LAA) cells may be increasingly common. Note that an LAA cell may aggregate licensed and unlicensed spectrum of a radio access network, e.g., at a media access control level, among various possibilities. For example, an LAA cell (e.g., a special type of secondary cell or SCell) may operate in an unlicensed band and may be assisted by an LTE cell (e.g., a primary cell or PCell) that may operate in a licensed band.

In general, a UE may establish a connection with the network through the PCell, and may subsequently establish a secondary connection with one or more SCells to increase throughput. The PCell and the one or more SCells may be collocated, or they may be instantiated as separate base stations, according to various embodiments. The PCell and the one or more SCells may operate according to the same RAT (e.g., 5G NR) or different RATs, according to various embodiments.

Different UEs may have different capabilities with regard to CA. For example, some UEs may be able to perform CA with certain combinations of frequency ranges, but not with other combinations of frequency ranges. Similarly, different cells, different regions, or different networks may use various combinations of frequency ranges for CA. For example, a given PLMN may have licenses to use different frequency ranges in one region than another.

Specific Absorption Rate (SAR) Backoff

In some embodiment, a UE may be configured to implement a specific absorption rate (SAR) backoff feature, wherein the UE may be configured to detect a grip orientation of the UE and/or detect the proximity of the UE to a user's hand and/or ear. When the UE is sufficiently close to a particular body part of the user (e.g., when the UE is placed against a user's ear), the SAR backoff feature may limit a transmission (Tx) power of the UE for one or more frequency ranges, to prevent excessive radiation exposure to the user and/or to comply with applicable laws and regulations. For example, a UE that supports millimeter wave (mmWave) or higher frequency transmissions may be configured to limit its Tx power for these frequencies in certain user grip conditions, to satisfy SAR limits and/or regulations. SAR limits may be tiered, in some embodiments, where a first Tx power limit is set while the device is being held in hand, and a second (e.g., more strict) Tx power limit is set while the device is held against a user's head. Further, in some embodiments, the Tx limits imposed by SAR regulations may vary depending on frequency. For example, higher frequency transmissions (e.g., above 30 GHz) such as those anticipated to be utilized by 5G NR may be subject to stricter transmission power limits during certain grip orientations than lower frequencies, as the higher frequencies may potentially pose a greater health risk to the user.

In these embodiments, even though the radio frequency (RF) link conditions may be symmetric with respect to uplink (UL) and downlink (DL), while the UE is limited by SAR backoff the link may become asymmetric (e.g., because Tx power is limited). The limits imposed on Tx power may adversely affect reception by the network of acknowledgment/negative acknowledgment (ACK/NACK) messaging sent by the UE. Accordingly, higher retransmission rates for DL communications from the network may occur if ACK/NACK messages do not reach the network, as the network may unnecessarily retransmit packets that were successfully received by the UE (e.g., if the network failed to receive an ACK message). This may be particularly undesirable when a UE is receiving a high volume of DL data while the UE is Tx limited (e.g., through a SAR backoff protocol or for another reason), potentially resulting in network congestion and excess expenditure of radio resources.

In a carrier aggregation (CA) scenario, a UE may be in communication with a primary cell (PCell) and one or more secondary cells (SCells). While the connection with the PCell may be of sufficiently high quality for successful ACK/NACK reception during normal transmission scenarios, this may not necessarily be the case when the UE is utilizing limited transmission power. To address these and other concerns, embodiments herein describe methods and devices to detect a preferred cell for ACK/NACK transmissions, and to transmit ACK/NACK messages on the preferred cell.

Figure 5:
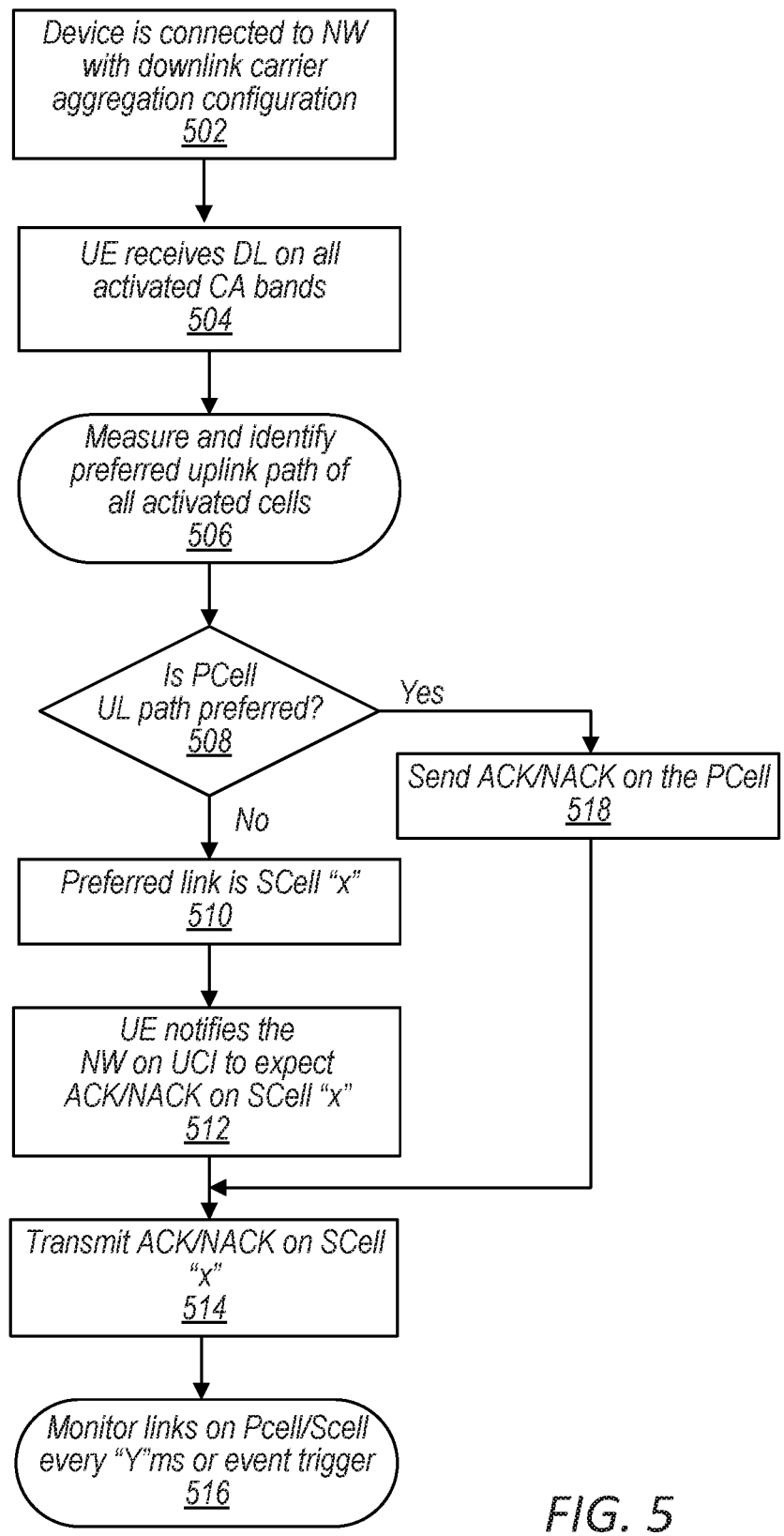
FIG. 5 is a flow chart diagram illustrating an exemplary method for transmitting acknowledgment messages over a preferred link, according to some embodiments.

FIG. 5 is a flowchart diagram illustrating a method for dynamically transmitting ACK/NACK messages on a preferred cell, according to some embodiments. Embodiments of the method of FIG. 5 may increase the likelihood that ACK/NACK messages are successfully received by the network, according to some embodiments. In various embodiments, some of the elements of the method shown may be performed concurrently, in a different order than shown, may be substituted for by other method elements, or may be omitted. Additional method elements may also be performed as desired.

Aspects of the method of FIG. 5 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry (e.g., 330), etc., among various possibilities) may cause the UE to perform some or all of the illustrated method elements. Similarly, processor(s) 404, baseband processor(s), processor(s) associated with communication circuitry (e.g., 430, 432), etc., among various possibilities) may cause the BS to perform some or all of the illustrated method elements. The techniques of FIG. 5 may be applied to various RRC messages that employ ACK/NACK messaging, among various possibilities. As shown, the method may operate as follows.

At 502, the UE may connect to a network that employs carrier aggregation in the downlink (DL). The network carrier may configure and activate up to N cells, each of which transmits information to the UE through a separate carrier aggregation frequency band on the DL At 504, the UE may receive DL communications on all activated CA bands. Each activated CA band may be associated with an activated cell, which may be a PCell or an SCell, for example. The UE may establish a connection with one PCell and one or more SCells, for example.

At 506, the UE may measure one or more properties of each of the activated bands, and may determine a preferred uplink path from the plurality of activated bands. This step is described in greater detail in FIG. 6, which illustrates a variety of criteria which may be used to determine a preferred CA band, according to various embodiments. In some embodiments, measuring the one or more properties of the activated bands to determine the preferred uplink path may be performed in response to a determination that transmission power of the UE has been throttled as a result of implementation of a SAR backoff procedure, or another factor. While the PCell may have a sufficiently strong signal strength to successfully receive ACK/NACK messaging from the UE during a normal transmission scenario, this may not necessarily be the case when the transmission power of the UE is throttled as a result of SAR backoff or another reason. Accordingly, transmission of ACK/NACK messaging through a preferred link, as described in greater detail below, may increase the likelihood of their successful reception by the network, in some embodiments.

Figure 6:
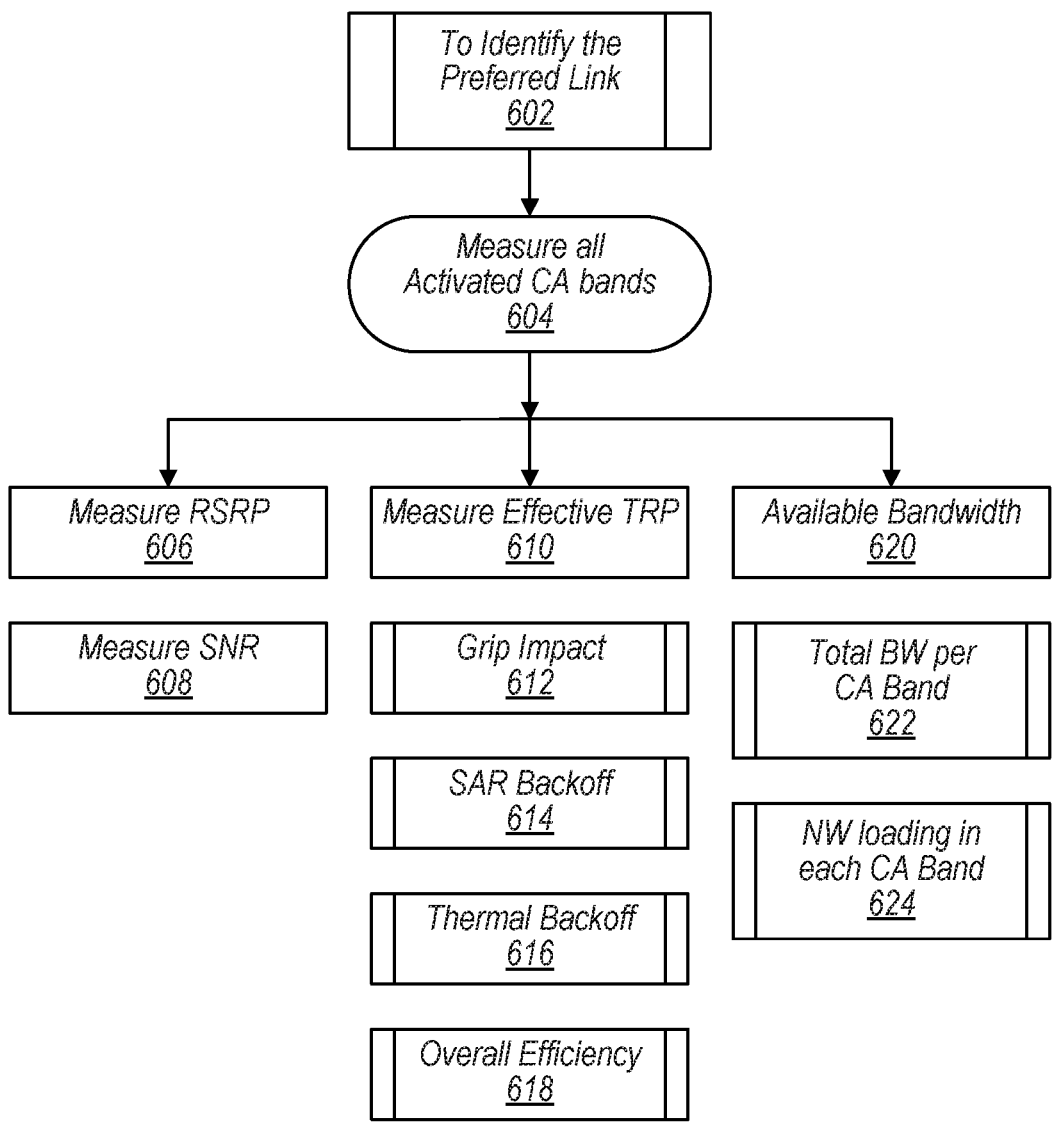
FIG. 6 is a flow chart diagram illustrating criteria utilized to determine a preferred link, according to some embodiments.

As illustrated, FIG. 6 shows a plurality of RF measurements and other factors that may be used to identify a preferred cell for transmitting ACK/NACK messaging at 602, according to various embodiments. The measurements and factors listed in FIG. 6 may be used in various combinations, whereby different subsets of the listed quantities and measurements may be considered, as desired. The measurements and factors used to determine the preferred cell in any particular embodiment may be aggregated to determine an overall preferability score, and the preferred cell may be determined based on the preferability score. The aggregation may apply different weights to different factors considered, in some embodiments.

As illustrated, the UE may measure one or more quality metrics for all activated CA bands at 604. For example, the UE may measure one or both of the reference signal received power (RSRP) at 606 and the signal-to-noise ratio (SNR) at 608 of the PCell and the one or more activated SCells. The measurements may be used to determine an uplink link budget for each of the activated cells, which may be different between the PCell and the one or more SCells, for example. The UE may consider a cell with a higher RSRP and/or SNR to be more preferable, for example.

The UE may further measure and/or determine one or more parameters associated with a SAR backoff feature currently activated on the UE device. For example, the UE may measure and/or determine one or more of an effective total radiated power (TRP) at 610 and/or equivalent isotropically radiated power (EIRP) allowed by the SAR backoff feature, a grip impact on the SAR implementation at 612, an amount of thermal backoff at 614, an overall antenna efficiency at 618, and/or other SAR backoff parameters, according to various embodiments. The SAR backoff parameters may be utilized to determine a likelihood of successfully transmitting ACK/NACK messaging through each of the PCell and the one or more SCells given the SAR backoff restrictions, to assist in determining a preferred cell for ACK/NACK messaging.

Additionally or alternatively, the UE may measure one or more of an available bandwidth at 620, a total bandwidth per CA band at 622, and/or current network loading on each of the activated cells at 624, in some embodiments. The UE may consider one or more of these quantities while determining a preferred cell. For example, the UE may prefer a cell with a higher available bandwidth, a higher total bandwidth, and/or lower current network loading over a cell with lower available bandwidth, lower total bandwidth, and/or higher current network loading.

Returning to FIG. 5, at 508, the UE may determine whether the PCell is the preferred link for transmitting UL ACK/NACK messaging. If the PCell is the preferred UL link, at 518 the UE may transmit ACK/NACK messaging through the PCell. However, if the PCell is not the preferred link, the UE may determine that a particular SCell "x" is the preferred link at 510.

The NW may typically configure the UE to send ACK/NACK on the Pcell. To override this default configuration, at 512, and in response to determining that SCell "x" is the preferred cell, the UE may notify the NW using uplink control information (UCI) that the UE intends to transmit ACK/NACK messaging over SCell "x" rather than over the PCell. The network may thereby expect to receive ACK/NACK messaging over the indicated SCell. At 514, the UE may then proceed to transmit ACK/NACK messaging over SCell "x".

At 516, the UE may monitor the activated links by periodically re-measuring the one or more properties of each of the activated bands, to dynamically redetermine which of the PCell or the one or more SCells is the current preferred UL link. In various embodiments, the UE may re-measure the one or more properties at a regular period (e.g., after a predetermined number of milliseconds), or it may re-measure the one or more properties based on an event trigger such as a determination that an ACK/NACK was unsuccessfully received, or another type of event trigger.

Figure 7:
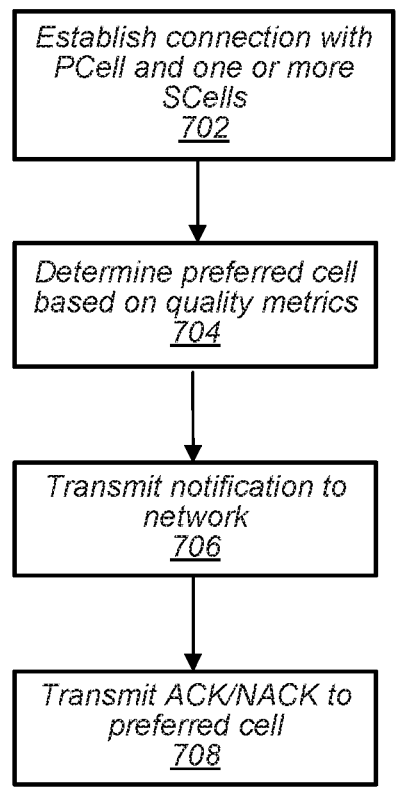
FIG. 7 is a flow chart diagram illustrating a method for determining a preferred cell and transmitting acknowledgment messages, according to some embodiments.

FIG. 7—Flowchart for Transmitting ACK/NACK Over Preferred Cell

FIG. 7 is a flow chart diagram illustrating a method for transmitting acknowledgment messages over a preferred cell, according to some embodiments. Embodiments of the method of FIG. 7 may increase the likelihood of successfully transmitting ACK/NACK messages to a network, especially during a limited transmission power scenario, by transmitting them over a preferred cell, according to some embodiments. In various embodiments, some of the elements of the method shown may be performed concurrently, in a different order than shown, may be substituted for by other method elements, or may be omitted. Additional method elements may also be performed as desired.

Aspects of the method of FIG. 7 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry (e.g., 330), etc., among various possibilities) may cause the UE to perform some or all of the illustrated method elements. Similarly, processor(s) 404, baseband processor(s), processor(s) associated with communication circuitry (e.g., 430, 432), etc., among various possibilities) may cause the BS to perform some or all of the illustrated method elements. Note that while at least some elements of the method of FIG. 7 are described in a manner relating to the use of communication techniques and/or features associated with 3GPP specification documents, such description is not intended to be limiting to the disclosure, and aspects of the method of FIG. 7 may be used in any suitable wireless communication system, as desired. The techniques of FIG. 7 may be applied to ACK/NACK messaging associated with various types of RRC messages, among various possibilities. As shown, the method may operate as follows.

At 702, a UE establishes a connection with a primary cell and one or more secondary cells. The primary cell and the one or more secondary cells may be configured to conduct coordinated DL communications with the UE according to a carrier aggregation (CA) protocol.

At 704, a preferred cell is determined from among the primary cell and the one or more secondary cells based at least in part on one or more quality metrics. In some embodiments, the preferred cell may either be the primary cell or one of the one or more secondary cells. In some embodiments, determining the preferred cell and transmitting the notification are performed at least in part in response to determining that the UE is in a limited transmission power scenario. In some embodiments, the limited transmission power scenario may be a result of implementation of a specific absorption rate (SAR) backoff procedure that has been enabled on the UE. For example, the UE may be configured to limit its transmission power in one or more frequency bands when the UE detects that it is in a certain grip orientation (e.g., held in hand, held against head, etc.). In these embodiments, responsive to detecting the limitation(s) to transmission power, the UE may determine a preferred cell for transmission of acknowledgment messages in one of the frequency bands in which the UE is limiting its transmission power.

In some embodiments, the one or more quality metrics may include one or more of an effective total radiated power, grip impact, SAR backoff parameters, thermal backoff parameters, overall efficiency. In some embodiments, the one or more quality metrics may include a measured reference signal received power (RSRP) and/or a measured signal-to-noise ratio (SNR) of each of the primary cell and the on or more secondary cells. Alternatively or additionally, for each the primary cell and the one or more secondary cells, the one or more quality metrics may include an available bandwidth for the cell, a total bandwidth of the cell, and/or network loading on the cell. The UE may aggregate one or more of the measured and/or determined quality metrics to determine the preferred cell.

At 706, a notification is transmitted to a network indicating that the UE intends to transmit an acknowledgement message to the preferred cell. For example, the UE may transmit a notification to the primary cell that a first one of the one or more secondary cells is the preferred cell, and that the UE intends to transmit acknowledgment messages to the first one of the one or more secondary cells.

At 708, the acknowledgment message is transmitted to the preferred cell. Advantageously, the likelihood of successful reception by the network of the acknowledgment message may be improved by transmitting the message to the preferred cell, especially in a limited transmission power scenario such as during implementation of a SAR backoff feature.

In some embodiments, the UE may periodically monitor the one or more quality metrics to obtain one or more updated quality metrics. In these embodiments, the UE may dynamically redetermine the preferred cell from among the primary cell and the one or more secondary cells based at least in part on the one or more updated quality metrics. In other words, the UE may dynamically update its preferred cell determination to adapt to changing radio conditions, SAR backoff restrictions, and/or network loading on the primary cell and the one or more secondary cells.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

In some embodiments, a network device (e.g., a BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The network device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
by a user equipment device (UE):
establishing a connection with a plurality of cells including a primary cell and one or more secondary cells of a base station;
determining a first cell from the primary cell and the one or more secondary cells for transmission of an acknowledgement message different from a second cell of the plurality of cells previously used for transmission of acknowledgement messages to the base station; and
transmitting the acknowledgment message to the first cell.

2. The method of claim 1,
wherein the first cell is one of the one or more secondary cells.

3. The method of claim 1,
wherein said determining the first cell and transmitting the acknowledgment message are performed at least in part in response to determining that the UE is in a limited transmission power state.

4. The method of claim 3,
wherein the limited transmission power state is a result of a specific absorption rate (SAR) backoff procedure that has been enabled on the UE.

5. The method of claim 4,
wherein the first cell is determined based at least in part on one or more quality metrics, and
wherein the one or more quality metrics comprise one or more of:
an effective total radiated power;
grip impact;
SAR backoff parameters;
thermal backoff parameters; and
antenna efficiency.

6. The method of claim 1,
wherein the first cell is determined based at least in part on one or more quality metrics, and
wherein, for each of the primary cell and the one or more secondary cells, the one or more quality metrics comprise one or more of:
a measured reference signal received power (RSRP); or
a measured signal-to-noise ratio (SNR).

7. The method of claim 1,
wherein the first cell is determined based at least in part on one or more quality metrics, and
wherein, for each respective cell of the primary cell and the one or more secondary cells, the one or more quality metrics comprise one or more of:
an available bandwidth for the respective cell;
a total bandwidth of the respective cell; and
network loading on the respective cell.

8. The method of claim 1,
wherein the first cell is determined based at least in part on one or more quality metrics, wherein the method further comprises:
periodically monitoring the one or more quality metrics to obtain one or more updated quality metrics; and
redetermining the first cell from the primary cell and the one or more secondary cells based at least in part on the one or more updated quality metrics.

9. A user equipment device (UE), comprising:
a radio; and
a processor operably coupled to the radio, wherein the UE is configured to:
establish a connection with a plurality of cells including a primary cell and one or more secondary cells of a base station;
determine a first cell from the primary cell and the one or more secondary cells for transmission of an acknowledgement message different from a second cell of the plurality of cells previously used for transmission of acknowledgement messages to the base station; and transmit the acknowledgment message to the first cell.

10. The UE of claim 9, wherein the first cell is one of the one or more secondary cells.

11. The UE of claim 9, wherein said determining the first cell and transmitting the acknowledgment message are performed at least in part in response to determining that the UE is in a limited transmission power state.

12. The UE of claim 11, wherein the limited transmission power state is a result of a specific absorption rate (SAR) backoff procedure that has been enabled on the UE.

13. The UE of claim 12, wherein the first cell is determined based at least in part on one or more quality metrics, and wherein the one or more quality metrics comprise one or more of:
an effective total radiated power;
grip impact;
SAR backoff parameters;
thermal backoff parameters; and
antenna efficiency.

14. The UE of claim 9, wherein the first cell is determined based at least in part on one or more quality metrics, and wherein, for each of the primary cell and the one or more secondary cells, the one or more quality metrics comprise one or more of:
a measured reference signal received power (RSRP); or
a measured signal-to-noise ratio (SNR).

15. The UE of claim 9, wherein the first cell is determined based at least in part on one or more quality metrics, and wherein, for each respective cell of the primary cell and the one or more secondary cells, the one or more quality metrics comprise one or more of:
an available bandwidth for the respective cell;
a total bandwidth of the respective cell; and
network loading on the respective cell.

16. The UE of claim 9, wherein the first cell is determined based at least in part on one or more quality metrics, and wherein the UE is further configured to:
periodically monitor the one or more quality metrics to obtain one or more updated quality metrics; and
redetermine the first cell from the primary cell and the one or more secondary cells based at least in part on the one or more updated quality metrics.

17. The apparatus of claim 9, wherein the first cell is determined based at least in part on one or more quality metrics, and wherein the processor is further configured to cause the UE to:
periodically monitor the one or more quality metrics to obtain one or more updated quality metrics; and
redetermine the first cell from the primary cell and the one or more secondary cells based at least in part on the one or more updated quality metrics.

18. An apparatus for inclusion within a user equipment device (UE), the apparatus comprising a processor configured to execute program instructions to cause the UE to:
establish a connection with a primary cell and one or more secondary cells;
determine a first cell from the primary cell and the one or more secondary cells for transmission of an acknowledgement message different from a second cell of the plurality of cells previously used for transmission of acknowledgement messages to the base station; and
transmit the acknowledgment message to the first cell.

19. The apparatus of claim 18, wherein the first cell is one of the one or more secondary cells.

20. The apparatus of claim 18, wherein the first cell is determined based at least in part on one or more quality metrics, and
wherein said determining the first cell and transmitting the acknowledgment message are performed at least in part in response to determining that the UE is in a limited transmission power state,
wherein the limited transmission power state is a result of a specific absorption rate (SAR) backoff procedure that has been enabled on the UE, and
wherein the one or more quality metrics comprise one or more of:
an effective total radiated power;
grip impact;
SAR backoff parameters;
thermal backoff parameters; and
antenna efficiency.

* * * * *